(12) United States Patent
Allen et al.

(10) Patent No.: US 9,966,643 B2
(45) Date of Patent: May 8, 2018

(54) BATTERY CELL HAVING AIR ELECTRODE ASSEMBLY BONDED TO CAN AND METHOD OF MANUFACTURE

(71) Applicant: Energizer Brands, LLC, St. Louis, MO (US)

(72) Inventors: Jeremy L. Allen, Rocky River, OH (US); Robert M. Janmey, Columbia Station, OH (US)

(73) Assignee: Energizer Brands, LLC, St. Louis, MO (US)

( * ) Notice: Subject to any disclaimer, the term of this patent is extended or adjusted under 35 U.S.C. 154(b) by 718 days.

(21) Appl. No.: 14/169,412

(22) Filed: Jan. 31, 2014

(65) Prior Publication Data

US 2015/0222000 A1   Aug. 6, 2015

(51) Int. Cl.
| | |
|---|---|
| *H01M 12/08* | (2006.01) |
| *H01M 2/04* | (2006.01) |
| *H01M 12/02* | (2006.01) |
| *H01M 12/06* | (2006.01) |
| *H01M 2/02* | (2006.01) |
| *H01M 10/04* | (2006.01) |

(52) U.S. Cl.
CPC ......... *H01M 12/08* (2013.01); *H01M 2/0222* (2013.01); *H01M 2/0426* (2013.01); *H01M 12/02* (2013.01); *H01M 12/06* (2013.01); *H01M 10/0427* (2013.01); *Y02E 60/128* (2013.01); *Y10T 29/4911* (2015.01)

(58) Field of Classification Search
CPC .......................... H01M 10/0427; H01M 12/08
USPC ....................................................... 429/403
See application file for complete search history.

(56) References Cited

U.S. PATENT DOCUMENTS

| | | | |
|---|---|---|---|
| 4,105,830 A | 8/1978 | Kordesch | |
| 4,557,983 A | 12/1985 | Sauer | |
| 5,587,259 A | 12/1996 | Dopp et al. | |
| 5,746,856 A | 5/1998 | Hendershot et al. | |
| 6,461,765 B1* | 10/2002 | Witzigreuter | H01M 2/0207 429/175 |
| 6,610,353 B1 | 8/2003 | Gibbons et al. | |
| 7,816,026 B2 | 10/2010 | Janmey | |
| 8,062,386 B2 | 11/2011 | Kelemen et al. | |
| 8,329,346 B2* | 12/2012 | Janse van Rensburg | H01M 2/0202 429/402 |

(Continued)

FOREIGN PATENT DOCUMENTS

| | | |
|---|---|---|
| DE | 3425171 A1 | 1/1986 |
| JP | 5648077 A | 5/1981 |

(Continued)

OTHER PUBLICATIONS

"White Paper—Bonding Low Surface Energy Plastics," Fabrico, a Division of EIS, 6 pages, www.fabrico.com.

(Continued)

*Primary Examiner* — Milton I Cano
*Assistant Examiner* — Abibatu O Ojo-Amoo
(74) *Attorney, Agent, or Firm* — Alston & Bird LLP (57) ABSTRACT

An electrochemical battery cell is provided having a housing formed by a can and a cup, with a sealing gasket disposed therebetween. First and second electrodes and electrolyte are disposed within the housing. The first electrode is provided in an electrode assembly that is bonded to the can in an air diffusion region to prevent doming of the electrode assembly.

19 Claims, 2 Drawing Sheets

(56) References Cited

U.S. PATENT DOCUMENTS

| | | |
|---|---|---|
| 8,377,149 B2 | 2/2013 | Dopp et al. |
| 2007/0054168 A1 | 3/2007 | Chang et al. |
| 2008/0076024 A1* | 3/2008 | Janmey ............... H01M 2/0207 |
| | | 429/185 |
| 2008/0096074 A1 | 4/2008 | Wu |
| 2011/0236799 A1* | 9/2011 | Burchardt ........... H01M 2/1653 |
| | | 429/534 |

FOREIGN PATENT DOCUMENTS

| | | |
|---|---|---|
| JP | 58218774 A | 12/1983 |
| JP | 62837886 A | 2/1987 |
| JP | 6369158 A | 3/1988 |
| JP | S63294672 A | 12/1988 |
| JP | H02139875 A | 5/1990 |
| JP | 2009259627 A | 11/2009 |

OTHER PUBLICATIONS

"DuPoint Tefzel fluoropolymer resin, Properties Handbook," DuPont Fluorproducts, Wilmington DE, 30 pages, (Nov. 2003), www.teflon.com.

"Application Sheet Welding PTFE Membranes," Telsonic Ultrasonics, Telsonic AG, Switzerland, 1 page, www.telsonic.com.

* cited by examiner

BATTERY CELL HAVING AIR ELECTRODE ASSEMBLY BONDED TO CAN AND METHOD OF MANUFACTURE

FIELD OF THE INVENTION

The invention is generally related to electrochemical battery cells with an improved cell design and the manufacture thereof.

BACKGROUND OF THE INVENTION

For many electronic devices, particularly small hand-held devices, there is a desire to make the devices as small as possible. This means that it is important for batteries used in battery-operated devices to also be as small as possible. At the same time, device users wish to minimize the frequency with which the batteries must be replaced. Consequently, there is an ongoing need to provide small batteries with higher energy efficiency. At the same time, minimizing the battery cost is a goal.

The energy efficiency of electrochemical battery cells can be maximized by minimizing the number of cell components and the volume of each to provide as much internal cell volume as possible for active materials and electrolyte. One approach has been to use a cell housing with electrically conductive housing members in direct contact with the cell electrodes as the battery terminals. A seal member such as a gasket or grommet is often used to electrically insulate the two battery terminals and provide a compressive seal therebetween. Examples of such cell designs are found in typical button and coin cells, as well as somewhat larger cells.

A common problem found in conventional metal-air cells is the bowing of the air electrode away from the base, commonly referred to as "doming" of the air electrode. Doming can be caused by inward radial forces on the edges of a metal screen or expanded metal current collector in the air cell, due to the tight fit of the current collector in the can to provide good electrical contact. The doming results in unused space within the battery cell which causes a loss of internal volume that could be used for active ingredients and may adversely affect leakproofness of the cell housing.

In view of the above, it is desirable to provide an electrochemical battery cell with an increased internal volume for the electrodes and electrolyte, having an air electrode assembly with reduced or eliminated doming. It is further desirable to provide for an electrochemical battery cell with excellent sealing characteristics and excellent leakage resistance.

SUMMARY OF THE INVENTION

An improved battery cell is provided and disadvantages of the prior art are overcome in an electrochemical battery cell with a housing including a can, a cup and a sealing gasket, and an electrode assembly. Positive and negative electrodes are in contact with the can and the cup, respectively, which serve as cell external contact terminals. The electrode assembly is bonded to a base of the can in an air diffusion region so as to prevent doming of the electrode assembly. These features provide significantly more usable internal volume within the cell housing and excellent sealing of the cell housing. The bonding of the electrode assembly to the can in an air diffusion region minimizes or reduces doming of the electrode assembly and provides significantly more internal volume. These features also provide excellent sealing of the cell housing, with long shelf life and good resistance to salting and leakage of electrolyte from the cell.

According to one aspect of the present invention, an electrochemical battery cell is provided. The electrochemical battery cell includes a cell housing having a first housing component and a second housing component, and an electrode assembly having a first electrode disposed within the cell housing in electrical contact with the first housing component, the electrode assembly having an air diffusion region. The electrochemical battery cell also includes a second electrode disposed within the cell housing in electrical contact with the second housing component, a gasket disposed between the first and second housing components, and a bond connecting the electrode assembly to the first housing component in the air diffusion region to prevent doming of the electrode assembly.

Embodiments of the aforementioned aspect of the invention can include any one or a combination of the following features:
- the bond is an ultrasonic weld;
- the electrode assembly includes a separator, the first electrode and an air diffusion layer, wherein the air diffusion layer is bonded to a base of the first housing component;
- the first housing component includes an electrically conductive metal can and the second housing component includes an electrically conductive metal cup;
- the can has a base and an upstanding wall, and the air diffusion region is located centrally above the base and displaced from the upstanding wall.
- the cell is a round or prismatic cell whose maximum external height between the base of the can and the base of the cup is less than the maximum external width of the can;
- the bond includes a plurality of bonds located within the air diffusion region;
- the first electrode is a positive electrode and the second electrode is a negative electrode; and
- the cell includes a metal air cell, and the positive electrode is a catalytic oxygen reduction electrode, the negative electrode comprising a metal selected from zinc, aluminum and lithium, or an alloy thereof, the electrolyte comprising an aqueous electrolyte.

According to another aspect of the present invention, an electrochemical battery cell includes a cell housing having an electrically conductive metal can, an electrically conductive metal cup, and a gasket disposed between the can and the cup. The electrochemical battery cell also includes an electrode assembly having a first electrode disposed within the cell housing in electrical contact with the metal can, the electrode assembly having an air diffusion region. The electrochemical battery cell further includes a second electrode disposed within the cell housing in electrical contact with the metal cup, and a bond connecting the electrode assembly to the metal can in the air diffusion region to prevent doming of the electrode assembly.

Embodiments of this aspect of the invention can include any one or a combination of the following features:
- the bond is an ultrasonic weld;
- the electrode assembly includes a separator, the second electrode and an air diffusion layer, wherein the air diffusion layer is bonded to a base of the metal can;
- the bond includes a plurality of bonds located within the air diffusion region;
- the can has a base and an upstanding wall, and the air diffusion region is located centrally above the base and displaced from the upstanding wall.

The cell is a round or prismatic cell whose maximum external height between the base of the can and a base of the cup is less than the maximum external width of the can;

the first electrode is a positive electrode and the second electrode is a negative electrode; and the cell is a metal air cell, and the positive electrode is a catalytic oxygen reduction electrode, the negative electrode comprising a metal selected from zinc, aluminum and lithium, or an alloy thereof, the electrolyte comprising an aqueous electrolyte.

According to a further aspect of the invention, a method is provided for making an electrochemical cell including a first electrode, a second electrode, a separator disposed between the electrodes, and an electrolyte, and a cell housing having an electrically conductive can, an electrically conductive cup, and a gasket disposed between the can and the cup in which the first and second electrodes, separator and electrolyte are disposed. The method includes the steps of disposing an electrode assembly containing the first electrode in the electrically conductive can and bonding the electrode assembly to the electrically conductive can within an air diffusion region of the electrode assembly to prevent doming of the electrode assembly. The method also includes the steps of disposing the second electrode in the cup, assembling a gasket between the cup and the can and assembling the can onto the cup so the gasket provides a seal between the can and the cup.

Embodiments of this further embodiment can include any one or a combination of the following features:

the step of bonding comprises ultrasonic welding the electrode assembly to the can; and the step of bonding comprises forming a bond in the air diffusion region away from a perimeter of the electrode assembly.

These and other features, advantages and objects of the present invention will be further understood and appreciated by those skilled in the art by reference to the following specification, claims and appended drawings.

Unless otherwise specified, the following definitions and methods are used herein:

the outside of the cell refers to the portions of the cell housing exposed to the external environment, and the inside of the cell refers to the contents disposed within the closed cell as well as the portions of the housing facing and in contact with the cell contents;

"inward" and "outward" are directions relative to the inside and the outside of the cell, respectively;

"top," "bottom," "up," "down," "left" and "right" are directions and locations with respect to the cells as oriented in the drawings;

"radial" is horizontal and "axial" is vertical with respect to the cells as oriented in the drawings;

"air diffusion region" of the electrode assembly is the region of the electrode assembly that is not compressed between the seal and the can and diffuses or distributes air to the electrode;

"doming of the electrode assembly" is the bowing of the electrode assembly away from the can base; and the internal volume of a cell is the volume defined by the inner surfaces of the cell housing.

Unless otherwise specified herein, all disclosed characteristics and ranges are as determined at room temperature (20-25° C.).

DESCRIPTION OF THE PREFERRED EMBODIMENT

The present invention is useful in an electrochemical battery cell having a positive electrode, a negative electrode and an electrolyte, all contained within a cell housing, with one of the electrodes assembled in an electrode assembly. The cell housing has two electrically conductive housing members, each in physical and electrical contact with one of the electrodes, and an electrically nonconductive gasket with a wall disposed between walls of the housing members. The housing members serve as the external electrical contact terminals of the cell. With reference to the portion of the housing in which opposite surfaces of the gasket wall are in contact with the two housing members, the housing member in contact with the outer surface of the gasket is referred to as a can, and the housing member in contact with the inner surface of the gasket is referred to as a cup. In certain embodiments the positive electrode is in contact with the can and the negative electrode is in contact with the cup, and in other embodiments the negative electrode is in contact with the can and the positive electrode is in contact with the cup. The size and shape of the cell are not limited. For example, the cell can be a small button or coin cell, or it can be larger; and it can have a round or prismatic cross-sectional shape.

Figure 1:
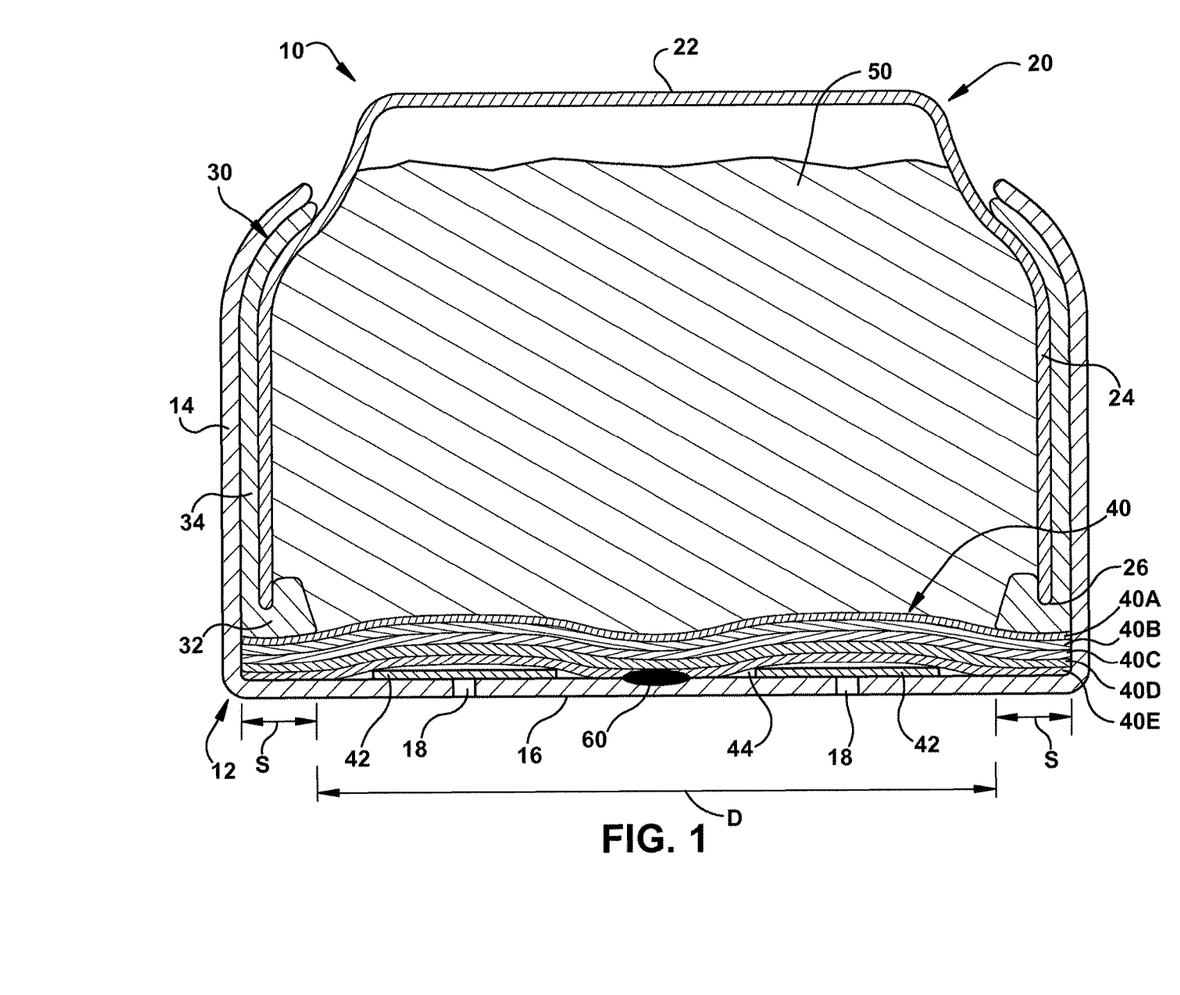
FIG. 1 is a full sectional elevational view of a round electrochemical battery cell having an air electrode assembly bonded to the can, according to one embodiment.
Figure 2:
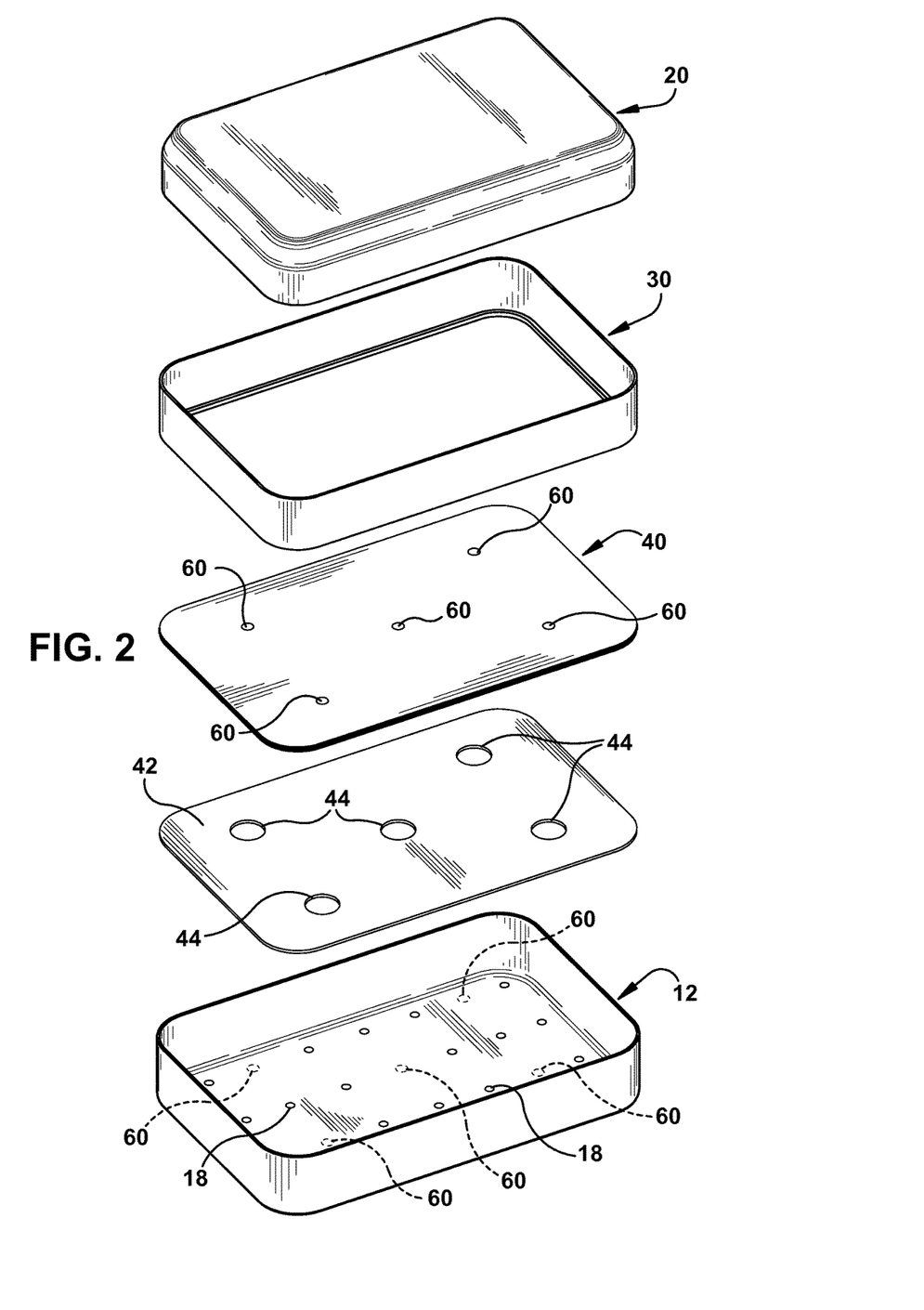
FIG. 2 is an exploded view of a prismatic electrochemical battery cell having a plurality of bonds connecting the electrode assembly to the can, according to another embodiment.

Although the cells shown in FIGS. 1 and 2 are each of certain cell types (round button and prismatic metal-air cells respectively, with one or more ports 18 in the can base 12 through which air can enter from outside the cell 1), the designs shown are not limited in usefulness to those cell types. These cell designs are shown to illustrate bonding of the electrode assembly to a housing component (e.g., can) to prevent doming of the electrode assembly.

In cells according to various embodiments of the present invention, the electrode assembly including the first electrode is bonded to the metal can. Compared to conventional cells, this reduces or eliminates doming of the electrode assembly. As a result, there is little reduction in the internal cell volume available for the second electrode compared to conventional cells and the sealed closure and leakproofness is enhanced.

The present invention can provide several benefits. The present invention can reduce or eliminate a common problem found in metal-air cells—bowing of the air electrode away from the can base (sometimes referred to as "doming" of the air electrode), which reduces the internal cell volume available for the other electrode. Doming can be caused by inward radial forces on the edges of a metal screen or expanded metal current collector in the air cell, due to the tight fit of the current collector in the can to provide good electrical contact. This provides for a significantly more internal volume which may be used for active ingredients. In addition, it stiffens the electrode in the planar direction so as to maintain better electrical contact to the perimeter of the can. Some of the benefits of two or more of these characteristics may be possible.

Referring to FIG. 1, an electrochemical battery cell 10 is shown according to one embodiment of the present invention. The cell 10 has a housing including a first housing component shown as an electrically conductive metal can 12, a second housing component shown as an electrically conductive metal cup 20, and a dielectric gasket 30 disposed between the can 12 and cup 20. The metal can 12 has a generally flat bottom base 16 with one or more openings 18 for allowing air or oxygen to enter the cell 10 to reach a fluid (e.g., air) consuming electrode. The method can 12 also has an upstanding peripheral wall 14. Openings 18 may or may not be provided in the can base 16 depending on the type of cell (e.g., fluid consuming cell or non-fluid consuming cell). The metal cup 20 has a peripheral wall 24 extending from a base 22 and a terminal end portion 26 engaging an L-shaped base 32 of gasket 30. The gasket 30 has an upstanding wall 34 extending from the L-shaped base 32. The gasket wall 34 is disposed between the can and cup walls 14 and 24. The outer and inner surfaces of the gasket wall 34 are in contact with the adjacent surfaces of the can and cup walls 14 and 24, respectively, to close the cell housing and provide a compression seal.

Contained within the housing is an electrode assembly 40 which may include a first electrode 40C (e.g., positive electrode also referred to as the cathode) and a separator 40A. In one embodiment, the first electrode 40C is a fluid consuming electrode such as an air electrode that consumes oxygen. A paper air diffusion layer 42 may be disposed between the electrode assembly 40 and base 16 of can 12 proximate to openings 18 in can base 16 to allow air to diffuse or distribute across the underside of the first electrode assembly 40. As a result, air entering the cell 10 through openings 18 is distributed across the air diffusion layer 42 and reaches the first electrode 40C.

Also contained within the housing is a second electrode 50 (e.g., negative electrode, also referred to as the anode). The separator 40A is disposed between the first and second electrodes 40C and 50, and electrolyte (not shown) is present. The first electrode 40C of electrode assembly 40 is in physical and electrical contact with the metal can 12, and the second electrode 50 is in physical and electrical contact with the metal cup 20. The gasket base 32 is disposed between the terminal end portion 26 of cup 20 and the peripheral region of the electrode assembly 40 containing the first electrode 40C and separator 40A. The can wall 14 applies a radial force against the adjacent gasket 30 and cup wall 24, creating compression seals between the gasket wall and the can and cup walls. It should be appreciated that the first electrode assembly 40 may include multiple assemblies of the first electrode 40C, the separator 40A, and other components, instead of the single assembly.

The electrode assembly 40 is shown having five layers 40A-40E according to one embodiment. Top layer 40A is the separator, layer 40B is a wire mesh screen or expanded metal, layer 40C is the first electrode, layer 40D is a first diffusion layer, and layer 40E is a second diffusion layer. The separator 40A may include a porous material, such as paper that dielectrically isolates the first electrode 40C from the second electrode 50 and allows ion permeation. The wire mesh screen 40B provides a conductive path and holds the first electrode mixture together. The first and second diffusion layers 40D and 40E may each include a Teflon® layer or PTFE that diffuses oxygen into the first air electrode 40C and prevents moisture and electrolyte from passing through. The electrode assembly 40 may be rolled or laminated into a strip that is held together by the wire mesh and punched into a unitary assembly, according to one embodiment.

In the cells according to the disclosed embodiments, the electrode assembly 40 is bonded by one or more bonds 60 to the base 16 of can 12 within an air diffusion region D away from the sealed perimeter region S of the can. At the sealed perimeter region S, the electrode assembly is generally compressed and the gasket 30 prevents air flow such that there is little or no air distribution or diffusion within region S. At the air diffusion region D, air is able to flow through the electrode uncompressed air diffusion layers 40D and 40E to reach air electrode 40C. The bond 60 may be provided by ultrasonic welding the electrode assembly 40 to the base 16 of can 12 to hold the electrode assembly 40 in a fixed position. By bonding the electrode assembly 40 to the base 16 of can 12 within the air diffusion region D, doming of the air electrode assembly 40 is prevented. In one embodiment shown in FIG. 1, a single bond 60 is used to hold the air electrode assembly 40 to the can 12. For larger cells such as the cell shown in FIG. 2, a plurality of bonds 60 may be formed between the electrode assembly 40 and the can 12 within the air diffusion region D. For example, five bonds 60 are shown in FIG. 2 within a diffusion area D bonding the air electrode assembly 40 to the base 16 of can 12. In order to form the bonds 60, openings 44 may be provided in air diffusion layer 42 to expose the area between the electrode assembly 40 and the can base 16 where the can base 16 is to be ultrasonically welded or otherwise bonded to the electrode assembly 40. Each of the bonds 60 may be formed in an opening 40 within air diffusion layer 42.

The bond(s) 60 may be formed by ultrasonic welding in which the can 12 and the electrode assembly 40 are welded together according to one embodiment. The ultrasonic weld may be achieved using conventional ultrasonic welding equipment. According to other embodiments, the bond(s) 60 may be formed by otherwise connecting and maintaining the connection between the can 12 and the electrode assembly 40. For example, the air electrode assembly 40 could be induction welded to the can 12, adhered to the can 12 via adhesive, fastened to the can 12, riveted to the can 12, staked to the can 12, or clipped to the can 12, according to other embodiments. Welding and adhering are preferred bonds, and ultrasonic welding is more preferred.

Accordingly, by employing one or more bonds 60 between the electrode assembly 40 and the base 16 of can 12 in the air diffusion region D, the electrochemical cell 10 advantageously minimizes or eliminates doming of the electrode assembly 40. As a result of the reduced doming, increased internal volume is available for active ingredients. Additionally, leakproofness of the electrochemical cell is improved.

The electrochemical cell 10 can be made according to one embodiment by disposing the electrode assembly 40 containing the first electrode 40C in the electrically conductive can 12 and bonding the electrode assembly 40 to the electrically conductive can 12 within an air diffusion region D of the electrode assembly 40 to prevent doming of the electrode assembly. The bonding may occur prior to assembly of the can 12 to the cup 20. The step of bonding may include ultrasonic welding the electrode assembly to the can. The step of bonding includes forming a bond in the air diffusion region away from a perimeter of the electrode assembly 40 where the electrode assembly 40 is compressed between the gasket 30 and can base 16. The method also includes the steps of disposing the second electrode in the cup, assembling a gasket between the cup and the can, and assembling the can onto the cup so the gasket provides a seal between the can and the cup.

The cup 20 may have a thickness in the range of 0.10 mm to 0.33 mm (0.004 in. to 0.013 in), preferably no greater than about 0.15 mm (0.006 in.). The can 12 may have a thickness in the range of 0.10 mm to 0.25 mm (0.004 in. to 0.010 in.), preferably no greater than about 0.20 mm (0.008 in.). The cup and can materials have good electrical conductivity and will have sufficient strength to maintain adequate sealing forces against the gasket 130 over a long period of time. The material itself can be resistant to attack by the cell contents or external environment, and/or the cup 20 and can 12 materials can be plated with a corrosion resistant material. Examples of cup materials that are known in the art include stainless steel and other steels, copper, and clad materials, particularly those including a steel layer. For aqueous alkaline cells a preferred material is a clad material with a middle layer of stainless steel, an outer layer of nickel and an inner layer of copper. Examples of can materials that are known in the art include stainless steel and other steels and copper. For aqueous alkaline cells suitable plating materials include zinc, indium, chromium, tin, copper and alloys thereof, such as alloys of copper and one or both of tin and zinc.

The gasket material is selected to be resistant to the contents of the cell and the external environment, to be able to form and maintain a compression seal between the can 12 and cup 20, to be essentially impermeable to the cell electrolyte, and to have a suitably low transmission rate for gases such as oxygen. Typically the gasket material is a polymeric material, and it may be a thermoplastic and/or an elastomeric polymer. Examples of materials that may be suitable include nylons, polyethylene, polypropylene, polyphthalamide, polystyrene, polysulfone, polytetrafluoroethylene, fluorinated ethylene-propylene.

It may be desirable to place a sealant material on at least some surfaces of the gasket to provide an improved seal between sealing surfaces that are not perfectly smooth (e.g., having a rough texture or imperfections such as scratches, nicks, projections and depressions). Sealants can fill lower areas in the surface that may otherwise provide a leakage path for liquids and gases between adjacent sealing surfaces. Any suitable sealant known in the art may be used.

One embodiment of the invention is a round or prismatic cell whose maximum external height between the can base and the cup base is less than the maximum external width of the can. The first electrode is an air electrode (a catalytic electrode that reduces oxygen contained in air that enters the cell from the external environment), and the second electrode contains a metal such as zinc, aluminum, magnesium or lithium.

Another embodiment is a prismatic metal air cell, which can include electrode and electrolyte materials similar to a button metal air cell.

Another embodiment of the invention is a button alkaline cell. One electrode (typically the first electrode) can contain a positive electrode active material such as silver oxide or mercuric oxide, and the other electrode (typically the second electrode) contains zinc and an aqueous alkaline electrolyte.

Another embodiment of the invention is a nonaqueous coin cell. One electrode (typically the first electrode) contains a positive electrode active material such as manganese dioxide, iron disulfide, copper oxide or carbon monofluoride; the other electrode (typically the second electrode) contains a negative electrode active material such as lithium, and the electrolyte is a nonaqueous electrolyte including an organic solvent.

Yet another embodiment of the invention is a rechargeable cell such as a nickel cadmium, nickel zinc, nickel hydrogen, silver oxide, zinc manganese dioxide, lead acid, lithium or lithium ion cell.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising:
    a cell housing comprising a first housing component and a second housing component;
    a gasket disposed between the first and second housing components;
    an electrode assembly comprising a first electrode disposed within the cell housing in electrical contact with the first housing component, the electrode assembly having a sealed perimeter region and a centrally-located air diffusion region, wherein the sealed perimeter region of the electrode assembly is compressed between the gasket and the first housing component and surrounds the centrally-located air diffusion region and the centrally-located air diffusion region is not compressed between the gasket and the first housing component;
    a second electrode disposed within the cell housing in electrical contact with the second housing component; and
    a mechanical bond connecting the electrode assembly to the first housing component in the centrally-located air diffusion region and wherein the mechanical bond is located away from the sealed perimeter of the electrode assembly to prevent doming of the electrode assembly.

2. The battery cell of claim 1, wherein the mechanical bond comprises an ultrasonic weld.

3. The battery cell of claim 1, wherein the electrode assembly comprises a separator, the first electrode and an air diffusion layer, wherein the air diffusion layer is mechanically bonded to a base of the first housing component.

4. The battery cell of claim 1, wherein the first housing component comprises an electrically conductive metal can and the second housing component comprises an electrically conductive metal cup.

5. The battery cell of claim 4, wherein the can has a base and an upstanding wall, and wherein the air diffusion region is located centrally above the base and displaced from the upstanding wall.

6. The battery cell of claim 5, wherein the cell comprises a round or prismatic cell whose maximum external height between the base of the can and a base of the cup is less than the maximum external width of the can.

7. The battery cell of claim 1, wherein the mechanical bond comprises a plurality of mechanical bonds located within the air diffusion region.

8. The battery cell of claim 1, wherein the first electrode is a positive electrode and the second electrode is a negative electrode.

9. The battery cell of claim 8, wherein the cell comprises a metal air cell, and the positive electrode is a catalytic oxygen reduction electrode, the negative electrode comprising a metal selected from zinc, aluminum and a lithium, or an alloy thereof, the electrolyte comprising an aqueous electrolyte.

10. An electrochemical battery cell comprising:
a cell housing comprising an electrically conductive metal can, an electrically conductive metal cup, and a gasket disposed between the can and the cup;
an electrode assembly comprising a first electrode disposed within the cell housing in electrical contact with the metal can, the electrode assembly having a sealed perimeter region and a centrally-located air diffusion region, wherein the sealed perimeter region of the electrode assembly is compressed between the gasket and the electrically conductive metal can and surrounds the centrally-located air diffusion region and the centrally-located air diffusion region is not compressed between the gasket and the electrically conductive metal can;
a second electrode disposed within the cell housing in electrical contact with the metal cup; and
a mechanical bond connecting the electrode assembly to the metal can in the centrally-located air diffusion region and wherein the mechanical bond is located away from the sealed perimeter of the electrode assembly to prevent doming of the electrode assembly.

11. The battery cell of claim 10, wherein the mechanical bond comprises an ultrasonic weld.

12. The battery cell of claim 10, wherein the electrode assembly comprises a separator, the first electrode and an air diffusion layer, wherein the air diffusion layer is mechanically bonded to a base of the metal can.

13. The battery cell of claim 10, wherein the mechanical bond comprises a plurality of mechanical bonds located within the air diffusion region.

14. The battery cell of claim 10, wherein the can has a base and an upstanding wall, and wherein the air diffusion region is located centrally above the base and displaced from the upstanding wall.

15. The battery cell of claim 14, wherein the cell comprises a round or prismatic cell whose maximum external height between the base of the can and a base of the cup base is less than the maximum external width of the can.

16. The battery cell of claim 10, wherein the first electrode is a positive electrode and the second electrode is a negative electrode.

17. The battery cell of claim 16, wherein the cell comprises a metal air cell, and the positive electrode is a catalytic oxygen reduction electrode, the negative electrode comprising a metal selected from zinc, aluminum and a lithium, or an alloy thereof, the electrolyte comprising an aqueous electrolyte.

18. A method of making an electrochemical cell comprising a first electrode, a second electrode, a separator disposed between the electrodes, and an electrolyte, and a cell housing having an electrically conductive can, an electrically conductive cup, and a gasket disposed between the can and the cup in which the first and second electrodes, separator and electrolyte are disposed, the method comprising the steps of:
disposing an electrode assembly containing the first electrode in the electrically conductive can;
bonding the electrode assembly to the electrically conductive can within an air diffusion region of the electrode assembly to prevent doming of the electrode assembly;
disposing the second electrode in the cup; assembling a gasket between the cup and the can; and
assembling the can onto the cup so the gasket provides a seal between the can and the cup.

19. The method of claim 18, wherein the step of bonding comprises ultrasonic welding the electrode assembly to the can.

* * * * *

UNITED STATES PATENT AND TRADEMARK OFFICE
CERTIFICATE OF CORRECTION

PATENT NO. : 9,966,643 B2
APPLICATION NO. : 14/169412
DATED : May 8, 2018
INVENTOR(S) : Allen et al.

Page 1 of 2

It is certified that error appears in the above-identified patent and that said Letters Patent is hereby corrected as shown below:

In the Claims

Column 10
Lines 18-35:
"18. A method of making an electrochemical cell comprising a first electrode, a second electrode, a separator disposed between the electrodes, and an electrolyte, and a cellhousing having an electrically conductive can, an electrically conductive cup, and a gasket disposed between the can and the cup in which the first and second electrodes, separator and electrolyte are disposed, the method comprising the steps of:
    disposing an electrode assembly containing the first electrode in the electrically conductive can;
    bonding the electrode assembly to the electrically conductive can within an air diffusion region of the electrode assembly to prevent doming of the electrode assembly;
    disposing the second electrode in the cup; assembling a gasket between the cup and the can; and
    assembling the can onto the cup so the gasket provides a seal between the can and the cup."

Should read:
--18. A method of making an electrochemical cell comprising a first electrode, a second electrode, a separator disposed between the electrodes, and an electrolyte, and a cell housing having an electrically conductive can, an electrically conductive cup, and a gasket disposed between the can and the cup in which the first and second electrodes, separator and electrolyte are disposed, the method comprising the steps of:
disposing an electrode assembly containing the first electrode within the cell housing in electrical contact with the electrically conductive can, wherein the electrode assembly has a centrally-located air diffusion region and a perimeter region surrounding the centrally-located air diffusion region;
    mechanically bonding the electrode assembly to the electrically conductive can within the centrally-located air diffusion region of the electrode assembly to prevent doming of the electrode assembly, wherein the mechanical bond is located away from the perimeter of the electrode assembly;

Signed and Sealed this
Twenty-fifth Day of September, 2018

Andrei Iancu
*Director of the United States Patent and Trademark Office* disposing the second electrode in the electrically conductive cup;

assembling a gasket between the electrically conductive cup and the electrically conductive can; and assembling the electrically conductive can onto the electrically conductive cup so that the gasket provides a seal between the can and the cup and the perimeter region of the electrode assembly is compressed between the gasket and the electrically conductive can and the centrally-located air diffusion region is not compressed between the gasket and the electrically conductive can.--